United States Patent [19]

Fleming et al.

[11] Patent Number: 5,306,891
[45] Date of Patent: Apr. 26, 1994

[54] LASER WELDING PROCESS FOR ATTACHING METAL TO CERAMIC SUBSTRATE

[75] Inventors: Michael P. Fleming, Lombard; Celia A. Berry, Schaumburg; Robert W. Shisler, Algonquin, all of Ill.

[73] Assignee: Motorola, Inc., Schaumburg, Ill.

[21] Appl. No.: 862,479

[22] Filed: Apr. 2, 1992

[51] Int. Cl.$^5$ .............................. B23K 26/00
[52] U.S. Cl. .............................. 219/121.64
[58] Field of Search .................... 219/121.64, 121.63

[56] References Cited

U.S. PATENT DOCUMENTS

H158  11/1986  Frausto .
4,697,061  9/1987  Spater et al. ............... 219/121.64
4,782,209  11/1988  Caers et al. ............... 219/121.64
5,023,993  6/1991  Fengelly .................... 29/843
5,111,277  5/1992  Medeiros, III et al. ....... 357/74
5,164,566  11/1992  Spletter et al. ........... 219/121.63

Primary Examiner—C. L. Albritton
Attorney, Agent, or Firm—Douglas D. Fekete; Donald B. Southard; Anthony J. Sarli

[57] ABSTRACT

A metal sheet is attached to a ceramic substrate utilizing a weld pad formed of tungsten layer that is preformed onto the substrate and features a faying surface coated with a gold film. The sheet is superposed onto the gold film and scanned with a laser beam to fuse the sheet and the gold, without fusing the tungsten, thereby avoiding spalling of the metal and microcracking of the ceramic.

9 Claims, 1 Drawing Sheet

LASER WELDING PROCESS FOR ATTACHING METAL TO CERAMIC SUBSTRATE

BACKGROUND OF THE INVENTION

This invention relates to a laser welding process that attaches a metal sheet to a ceramic substrate. More particularly, this invention relates to a process that includes welding a metal sheet to a gold-plated tungsten pad preformed on the substrate.

In the design of microelectronic components, it is common to include a sheet metal element affixed to a ceramic substrate. For example, in an oscillator crystal assembly, a crystal is mounted upon sheet metal tabs, which tabs are in turn mounted upon a ceramic substrate. In common practice, metal pads are preformed on the substrate, and the tabs are bonded to the pads using an epoxy adhesive. The bond pads are formed of tungsten that is plated with a nickel thin film and an outermost gold thin film that provides a suitable surface for bonding to the adhesive. Problems arise in reliably dispensing the adhesive in the precise microquantities required to produce an adequate bond without seeping onto adjacent areas. Also, there is a tendency for the tab to shift position prior to curing. Still further, although the adhesive contains silver particles to enhance electrical conductivity, the bond nevertheless exhibits increased electrical resistance that interferes with electrical current that is applied to the crystal through the tabs via the pads.

Laser welding of metals is generally known. Since ceramic does not weld to metal, it has been proposed to apply a metal pad to the ceramic substrate to provide a base for welding. However, thermal cycling that accompanies fusion of the metal pad tends to produce microcracking in the underlying ceramic or spalling of the metal pad from the ceramic. Thus, a process is desired for laser welding a metal sheet to a metal pad on a ceramic substrate which avoids fusion of the pad.

SUMMARY OF THE INVENTION

This invention contemplates an improved laser welding process for attaching a metal sheet to a ceramic substrate, which utilizes a metal weld pad formed of tungsten and having a gold-plated faying surface. Accordingly, a tungsten pad is intially formed on the substrate. Thereafter, a thin film of gold is plated onto the pad. In a preferred aspect of this invention, a nickel layer may be interposed between the tungsten base and the gold film to promote adhesion of the gold film. The metal sheet is superposed onto the gold film and scanned with a laser beam to heat the metal to a temperature effective to fuse the sheet and the gold, without fusing the underlying tungsten. The resulting integral structure thus features a weldment derived by fusion of the sheet to the gold film and bonded to the ceramic through the tungsten pad. By restricting fusion to avoid the tungsten, the process of this invention minimizes spalling of the metal or microcracking of the ceramic, while producing a strong bond attaching the sheet to the substrate.

DESCRIPTION OF THE DRAWINGS

The present invention will be further illustrated with reference to the accompanying drawings wherein.

DETAILED DESCRIPTION OF THE INVENTION

Figure 1:
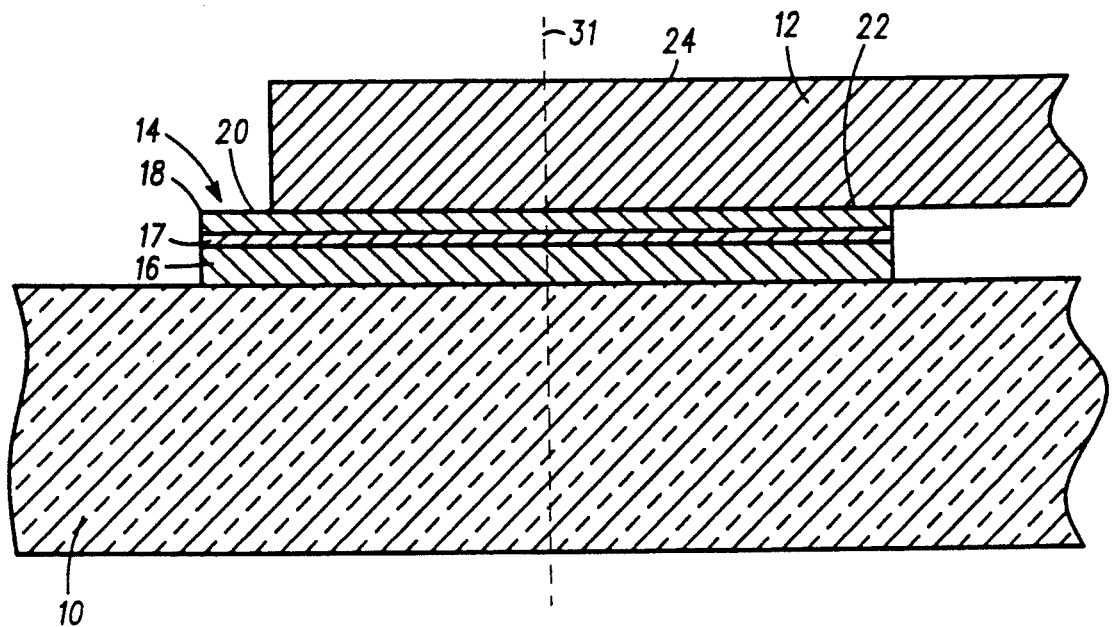
FIG. 1 is a cross-sectional view showing a metal and ceramic elements arranged in preparation for welding in accordance with this invention.

In accordance with a preferred embodiment of this invention, referring to FIG. 1, there is depicted a ceramic substrate 10 arranged with a metal sheet 12 in preparation for attaching the sheet to the substrate by laser welding.

Substrate 10 is formed of sintered alumina and has a thickness of about 508 microns. Substrate 10 is formed by compacting alumina particles to produce a green compact, and heating the compact to a temperature of about 1500° C. to sinter the alumina into an integral body. In preparation for welding, a welding pad 14 is formed on the substrate. Pad 14 comprises a tungsten layer 16 having a thickness of about 15 microns. Layer 16 is concurrently formed with the underlying alumina in a conventional co-firing process. A tungsten paste is intially printed onto the surface of the green compact and dried. The paste is composed of tungsten particles dispersed in a volatile organic vehicle. Thereafter, during sintering of the alumina, the tungsten particles are bonded into an intergral plate. The sintered structure thus features the tungsten plate tightly bonded to the ceramic substrate. The structure may include a metallized via (not shown), formed by coating holes in the green compact with the tungsten paste and co-firing. The via is integrally connected to layer 16 and extends through the substrate for remote connection to an electrical circuit for conducting electrical current to or from the plate, and thus to or from the metal sheet welded to the plate. Because of difficulty in targetting the laser beam onto the sheet at the site of the via, the weld is generally formed at a site spaced apart from the via. However, the weld may be suitably formed immediately over the via without damage to the via or the ceramic.

In preparation for welding in accordance with this invention, layer 16 is coated with a first thin film 17 formed of nickel and a second thin film 18 formed of gold. Thin film 17 is formed by vapor depositing a film of nickel onto layer 16 and heating to a temperature of about 900° C. to sinter bond the nickel to the tungsten. Thereafter, a first gold plate having a thickness of about 0.6 micron is electroplated onto nickel layer 17 and fired at about 720° C. This is followed by a second plate of gold that is electroplated onto the first plate and has a thickness between about 0.6 and 1.7 microns. The two plates cooperate to form film 18 that includes an outermost faying surface 20 adapted for contact to sheet 12.

Sheet 12 is preferably formed of a copper-base alloy, designated C77000 by the American Society of Metals, containing about 18 weight percent nickel, about 27 weight percent zinc, and the balance substantially copper and having a melting temperature of about 1055° C. Sheet 12 includes an inner, faying surface 22 and an opposite outer surface 24 that is accessible for scanning by a laser beam. Sheet 12 has a thickness of about 127 microns, substantially greater than the thin films 17 and 18.

Figure 2:
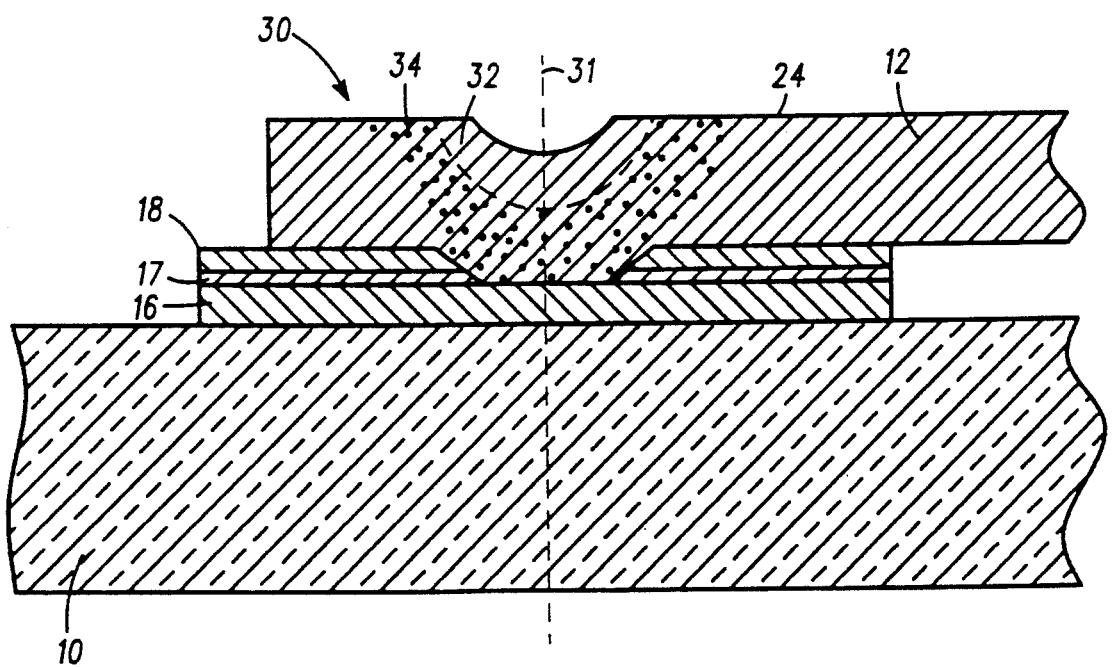
FIG. 2 is a cross-sectional view showing a product structure formed by welding the elements in FIG. 1.

In preparation for welding, substrate 10 with weld pad 14 and sheet 12 are arranged such that the faying surface 22 of sheet 12 lies immediately against gold surface 20. Surface 24 is scanned with a laser beam to fuse the copper alloy to the gold-nickel films overlying the tungsten layer and a welded assembly 30 shown in FIG. 2. In accordance with this preferred embodiment, the weld was formed by a trepanning operation wherein the laser beam scans a circular path having a diameter of about 250 microns about center axis 31. The laser beam was produced by a NdYAG laser device. For welding, the focal length was adjusted between about 50 and 100 millimeters and the power between about 80 and 100 watts. The laser scanned the circular path at a speed between 75 and 150 rpm, corresponding approximately to a scanning speed of between 1.0 and 2.0 millimeters per second. Irradiation time was between about 0.75 and 1.25 seconds. Preferred welding conditions are a focal length of 75 millimeters, a power of 90 watts, a speed of 125 rpm (about 1.6 millimeters per second), and a time of 0.88 second.

Following welding, sheet 12 is welded to the tungsten layer by a weldment that includes a weld nugget 32 surrounded by a heat affected zone 34. Within the rapidly scanned circular laser path, the fused metal coalesces to form an integral nugget symmetrical about the center of the path. Also, heating is concentrated within the path to maximize the depth of nugget penetration at the center. Preferably, laser scan parameters are optimized to form a nugget 32 that penetrates proximate to tungsten layer 16, but without contact. However, no evidence is observed of tungsten fusion even in nuggets formed against layer 16. Within zone 34, temperatures are sufficient to produce alloying, so that the gold and nickel films are no longer distinguishable.

The resulting weldment provides a strong mechanical bond between sheet 12 and tungsten layer 16, which in turn is tightly bonded to the underlying ceramic, thereby tightly attaching the sheet to the substrate. Moreover, the weldment also provides intimate contact between the metals to produce a low resistance electrical connection. Thus, film 16 may be suitably coupled to a remote electrical circuit, for example, by means of a tungsten via, to serve as a lead for conducting electrical current to or from sheet 12.

In the described embodiment, the weld pad is formed of a tungsten layer coated by thin metal films of nickel and gold. It is a significant feature of this invention that the tungsten layer survives the welding operation without noticeable fusion. While not limited to any particular theory, this is attributed to the relatively high melting temperature of tungsten, which is about 3410° C. In contrast, gold melts at about 1,453° C., and nickel melts at about 1063° C., significantly less than tungsten. By appropriate adjustment of the laser parameters, including, in particular, scanning speed and intensity, heat transfer is controlled to produce fusion of the copper alloy and the lower melting metal films, in particular the gold film, without exceeding the fusion temperature of the tungsten. Thus, the integrity of the tungsten layer is maintained throughout the welding process to inhibit detachment from or microcracking of the underlying ceramic.

The sucess of this invention is attributed in large part to the gold film that forms the faying surface for attachment to the sheet. In general, it is desired to minimize the thickness of the gold film, so as to reduce the expense thereof. Gold films having thicknesses between about 0.5 and 2.5 microns, and preferably between about 0.8 and 1.3 microns, are believed to be effective to enhance welding to the tungsten base. The gold and nickel films may be deposited either to cover the entire surface of the tungsten pad, or alternately may be limited to the region of the weld.

The process of this invention is particularly well suited for attaching a copper-base sheet to a ceramic substrate. As used herein, copper-based metal refers to copper or an alloy containing at least about 50 weight percent copper. Preferably, the copper alloy contains between about 16.5 and 19.5 weight percent nickel and between about 14 and 30 percent zinc, and has a melting temperature less than 1150° C. In general, the sheet exhibits a thickness substantially greater than the thin films utilized to form a weld pad. In a typical microelectronic package, the sheet is fabricated to produce an electrical feature, such as a mounting tab for supporting a quartz crystal. To facilitate handling and forming, a thickness of at least about 75 microns is desired. Thicknesses greater than about 250 microns require excessive heat to penetrate during welding. The substrate may be formed of any suitable ceramic material including, in addition to alumina as in the described embodiment, silicon dioxide and aluminum nitride.

While this invention has been described in certain embodiments thereof, it is not intended that it be limited to the above description but rather only to the extent set forth in the claims that follow.

The embodiments of the invention in which an exclusive property or privilege is claimed are defined as follows:

1. A laser welding process for attaching a metal sheet to a ceramic substrate, said process comprising
    forming a tungsten layer on the substrate,
    depositing a gold film onto the layer,
    superposing a metal sheet onto the substrate such that a faying surface of the sheet lies in contact with the gold film and is opposite an outer surface of the sheet, said sheet being formed of a metal having a melting temperature less than the melting temperature of tungsten, and
    irradiating the outer surface of the metal sheet using a laser beam to heat the faying surface to a temperature effective to melt and fuse the gold film and the sheet but not to fuse the tungsten layer.

2. A laser welding process for attaching a metal sheet to a ceramic substrate, said sheet being formed of a copper-base metal having a melting temperature, said process comprising
    forming a tungsten layer onto the substrate,
    depositing a nickel film onto the tungsten layer,
    depositing a gold film onto the nikel film,
    superposing the metal sheet onto the gold film such that a faying surface of the sheet lies in contact with the gold film and an outer surface of the sheet lies opposite the faying surface, and
    scanning the outer sheet surface with a laser beam to heat the paying surface to a temperature effective to fuse the copper-base metal and the gold film but not to fuse the tungsten.

3. A laser welding process for attaching a copper-base metal sheet to a ceramic substrate, said process comprising
    compacting alumina particles to form a green compact,
    applying and drying a tungsten paste on the compact, said paste comprising tungsten particles dispersed in a volatile vehicle,
    firing the compact to sinter the alunima into an integral substrate, whereupon the tungsten particles are concurrently sintered to form a layer bonded to the substrate, depositing a nickel film onto the tungsten layer, depositing a gold film onto the nickel film, said gold film having a thickness between about 0.5 and 2.5 microns, superposing the metal sheet onto the second film such that a faying surface of the sheet lies in contact with the gold film and an outer surface of the sheet lies opposite the faying surface, and scanning the outer sheet surface with a laser beam to heat the metals to a temperature effective to melt and fuse the copper-base metal and gold, but not sufficient to fuse the tungsten layer.

4. The process according to claim 3 wherein the laser beam scanning forms a single weld nugget centrally disposed within the path.

5. A process in accordance with claim 4 wherein the laser beam scanning forms a single weld nugget centrally disposed within the path.

6. A process in accordance with claim 3 wherein the copper-base metal comprises at least 50 weight percent copper.

7. A process in accordance with claim 3 wherein the copper-base metal sheet is composed of an alloy comprising between about 16.5 and 19.5 weight percent nickel, between about 14 and 30 weight percent zinc and the balance copper.

8. A process in accordance with claim 3 wherein the copper-base sheet has a thickness between 75 and 250 microns.

9. A process in accordance with claim 3 wherein the gold film has a thickness between about 0.8 and 1.3 microns.

* * * * *

UNITED STATES PATENT AND TRADEMARK OFFICE
CERTIFICATE OF CORRECTION

PATENT NO. : 5,306,891

DATED : April 26, 1994

INVENTOR(S) : Michael P. fleming, Celia A. Berry, Robert W. Shisler

It is certified that error appears in the above-identified patent and that said Letters Patent is hereby corrected as shown below:

Column 5, line 15

The process according to claim 3 wherein the laser beam scans a circular path.

Signed and Sealed this

Twenty-third Day of August, 1994

Attest:

BRUCE LEHMAN

Attesting Officer     Commissioner of Patents and Trademarks